United States Patent [19]
Matsubara et al.

[11] Patent Number: 5,598,077
[45] Date of Patent: Jan. 28, 1997

[54] CONTROL APPARATUS AND A CONTROL METHOD FOR A SERVOMOTOR

[75] Inventors: Shunsuke Matsubara; Yasusuke Iwashita; Tadashi Okita, all of Yamanashi, Japan

[73] Assignee: Fanuc Ltd., Yamanashi, Japan

[21] Appl. No.: 416,898

[22] PCT Filed: Aug. 10, 1994

[86] PCT No.: PCT/JP94/01326

§ 371 Date: Apr. 18, 1995

§ 102(e) Date: Apr. 18, 1995

[87] PCT Pub. No.: WO95/05703

PCT Pub. Date: Feb. 23, 1995

[30] Foreign Application Priority Data

Aug. 19, 1993 [JP] Japan ................................. 5-225027
Dec. 16, 1993 [JP] Japan ................................. 5-342810

[51] Int. Cl.$^6$ ............................................. G05B 11/01
[52] U.S. Cl. ..................... 318/568.22; 318/609; 318/630; 364/161
[58] Field of Search ................................. 318/560–574, 318/630, 606–610, 807–811; 364/148–151, 158, 160–166

[56] References Cited

U.S. PATENT DOCUMENTS

| | | | |
|---|---|---|---|
| 4,271,385 | 6/1981 | Azusawa | 318/722 |
| 5,101,146 | 3/1992 | Teshima | 318/572 |
| 5,204,602 | 4/1993 | Iwashita | 318/630 |
| 5,440,218 | 8/1995 | Oldenkamp | 318/701 |
| 5,467,004 | 11/1995 | Matsuo et al. | 318/807 |

FOREIGN PATENT DOCUMENTS

| | | |
|---|---|---|
| 0460224A1 | 12/1991 | European Pat. Off. . |
| 4025449A1 | 2/1991 | Germany . |
| 62-126403 | 6/1987 | Japan . |
| 3-228106 | 10/1991 | Japan . |

Primary Examiner—Brian Sircus
Attorney, Agent, or Firm—Staas & Halsey

[57] ABSTRACT

The present invention relates to motor control at the time of reversal of direction of feed axes of a machine tool using a servomotor. The present invention includes a disturbance torque estimating unit for estimating a disturbance torque and estimating a frictional torque. The value in a speed loop integrator is divided into a frictional torque component and an acceleration torque component. An integrator target value for the time of reversal of motor rotation is obtained in accordance with the acceleration torque component and a value obtained by inverting the sign of the frictional torque component. Backlash acceleration correction is effected using a value obtained by applying a certain offset to a speed command so that the integrator target value is reached, as a backlash acceleration value. In estimating the frictional torque, a ratio of torque constant to inertia is estimated automatically, and the frictional torque is estimated by using this ratio. Since proper backlash acceleration correction can be effected, quadrant projections are minimized.

9 Claims, 11 Drawing Sheets

Kp: POSITION GAIN

SPEED

SPEED

ACCELERATION a1

ACCELERATION a2

TORQUE SURPASSING FRICTION ft1

TORQUE SURPASSING FRICTION ft2

IDEAL INTEGRATOR BEHAVIOR
PRIOR ART TARGET VALUE
TARGET VALUE t1

FRICTIONAL TORQUE LEVEL (= ft1)

LOW-SPEED MODE

IDEAL INTEGRATOR BEHAVIOR
PRIOR ART TARGET VALUE
TARGET VALUE
t2

FRICTIONAL TORQUE LEVEL (≠ ft2)

HIGH-SPEED MODE

LOW-SPEED MODE

HIGH-SPEED MODE

CONTROL APPARATUS AND A CONTROL METHOD FOR A SERVOMOTOR

TECHNICAL FIELD

The present invention relates to a control apparatus and a control method for a servomotor which drives feed axes of a table or the like of a machine tool, etc., and more particularly, to backlash acceleration correction for the time of reversal of the moving direction of the feed axes.

BACKGROUND ART

In reversing the direction of drive of servomotors for driving tables, etc. in a machine tool or the like, the machine normally cannot be reversed at once, due to influences of backlash and friction of feed screws. When the quadrant changes while arcuate cutting or the like is being carried out by the machine tool, projections are formed on an arcuate cut surface. In subjecting a workpiece to arcuate cutting on X- and Y-axis planes, for example, the quadrant changes as the machine is driven in the positive direction with respect to the X axis and in the negative direction with respect to the Y axis. When the movement crosses the X axis, for example, the machine is driven in the negative direction with respect to the Y axis without change in direction and in the negative direction with respect to the X axis, switched from the positive direction. In this case, cutting is carried out at the same speed with respect to the Y axis as before the changeover. With respect to the X axis, however, the position deviation becomes "0", so that the torque command value is small, and friction prevents the servomotors from being reversed at once. Moreover, the movement of the tables cannot follow up movement commands and is subject to delay, due to the backlash of the feed screws for feeding the tables. The reduction of the torque command value and the generation of the backlash result in formation of projections on arcuate cut surfaces.

Conventionally, in order to prevent the formation of the projections on the cut surfaces or reduce the height of the projections, a motor control method based on the so-called backlash acceleration correction has been carried out so that the position deviation is subjected to positional backlash correction when the moving direction is reversed. Further a suitable value (acceleration value) is added to a speed command to effect acceleration in the reverse rotating direction of the servomotors, thereby reducing quadrant projections.

FIG. 11 is a block diagram illustrating a motor control method based on backlash acceleration correction (see Jpn. Pat. Appln. KOKAI Publication No. 3-228106, for example) as one method of backlash acceleration. According to this conventional motor control method based on backlash acceleration correction, backlash acceleration correction is effected in a manner such that the value in a speed control loop integrator (term of K1/S in FIG. 11) just before the reversal of direction is obtained, and a value obtained by inverting the sign of this value is used as a target value after the reversal. Further, the backlash acceleration correction is effected in such a manner that and in each speed control loop process within a set time after the reversal of direction, the product of a suitable constant value and a value obtained by subtracting the value in the integrator for each speed control loop process from the target value is used as a backlash acceleration value for each speed control loop process.

However, the conventional motor control method described above has a problem that satisfactory backlash acceleration correction cannot be achieved when the speed of arcuate motion increases.

Referring to FIGS. 12A–12H, the reason for this circumstance will be described. Ideally, the value in the speed control loop integrator should be equal to the sum of frictional torque and acceleration torque components. As the motor rotation is reversed, the sign of the frictional torque is inverted, as indicated by ft1 in FIG. 12C and ft2 in FIG. 12G. On the other hand, the acceleration torque component forms a cosine wave which is obtained by differentiating a speed sine wave with time, and its absolute value has a maximum at the point of time of the reversal of motor rotation, as indicated by a1 in FIG. 12B and a2 in FIG. 12F.

First, I1 (=a1+ft1) in FIG. 12D represents an ideal behavior of the integrator in the case where the motor rotating speed for arcuate motion is low. Hereupon, according to the conventional motor control method, the target value of the integral value just after the reversal of motor rotation is obtained by multiplying the integrator value just before the reversal by minus 1, so that the acceleration torque component a1, as well as the frictional torque component ft1, is inverted. Thus, the conventional target value for the integrator just after the reversal of motor rotation is set at a value which is lower than an ideal target value (value I1 in (d) of FIG. 12 for the time of the reversal of motor rotation) by the acceleration torque component a1.

In the case where the motor speed is thus low, however, the absolute value of the acceleration torque component a1 is much smaller than that of the frictional torque component ft1 (or is a negligible value), as seen from FIG. 12B and FIG. 12C, so that the conventional target value for the integrator just after the reversal of motor rotation has no specially great difference from the ideal target value mentioned here. Accordingly, the backlash acceleration correction based on the conventional motor control method would arouse no special problem.

When the motor is rotated at high speed, however, the absolute value of the acceleration torque component a2 becomes greater than that of the frictional torque component ft2 by a nonnegligible margin, so that the conventional target value for the integrator just after the reversal is subject to a substantial difference from the ideal target value, i.e., I2 (=a2+ft2) shown in FIG. 12H. Thus, with the backlash acceleration correction based on the conventional motor control method, the target value is set to be so small that satisfactory backlash acceleration correction cannot be effected.

FIG. 13 illustrates how the delay of the reversal can be reduced as indicated by a full line, in contrast with the case where backlash acceleration control is not effected, when the backlash acceleration control is carried out with the acceleration component regarded as negligible and with the aforesaid frictional torque component set so as to be the inverted target value for the speed control loop integrator, in the case where the motor rotating speed for arcuate motion is low.

FIG. 14 illustrates how the inverted target value for the speed control loop integrator becomes lower than a true inverted target value, which contains the acceleration torque component, so that acceleration is not good enough for correct backlash acceleration when the backlash acceleration control is carried out with the acceleration component neglected and with only the frictional torque component set so as to be the inverted target value, in the case where the motor rotating speed for arcuate motion is high.

3

Thus, the conventional motor control method described above has a problem that satisfactory backlash acceleration correction cannot be achieved if the speed of arcuate motion increases.

SUMMARY OF THE INVENTION

The object of the present invention is to provide a servomotor control apparatus and a control method, capable of solving the problem of the conventional servomotor control method described above and correctly setting a target value for a speed control loop integrator just after the reversal of motor rotation.

In order to achieve the above object, a servomotor control apparatus according to the present invention comprises: disturbance torque estimating means for estimating the magnitude of a disturbance torque to which the servomotor is subjected; integrator target value setting means for setting, as a target value for a speed control loop integrator, the sum of the value in the integrator for the time of reversal of servomotor rotation and a value obtained by doubling a value which is obtained by inverting the sign of the disturbance torque just before the reversal of motor rotation, which is estimated by the disturbance torque estimating means; and speed command offset applying means for applying an offset to a speed command after the reversal of motor rotation so that the integrator can quickly shift to the target value set by the target value setting means.

Preferably, the offset applied to the speed command offset applying means is a value obtained by multiplying the difference between the set target value for the integrator and the present value therein by a certain coefficient.

Preferably, moreover, the disturbance torque estimating means includes a term for a ratio of torque constant to inertia ratio as a parameter of the motor model, and the value of the term is modified at every processing period by means for suitably modifying the same.

Further, a servomotor control method according to the present invention is a motor control method applied at the time of reversal of direction of feed axes of a machine tool or the like using a servomotor, in which a disturbance torque to which the servomotor is externally subjected just before the reversal of servomotor rotation is estimated by disturbance torque estimating means; the value in a speed loop integrator is divided into a frictional torque component, which is equal to the estimated disturbance torque, and an acceleration torque component as the remainder; the sum of the acceleration torque component and a value obtained by inverting the sign of the frictional torque component is set as an inverted target value in the speed loop integrator at the time of the reversal of servomotor rotation; and a speed command is modified by applying a certain offset to the speed command so that the integrator quickly shifts toward the inverted target value.

Preferably, the offset is a value obtained by multiplying the difference between the inverted target value set in the speed loop integrator and the present value therein by a predetermined coefficient.

Preferably, moreover, the addition of the offset to the speed command is repeated a preset number of times, whereupon the offset is zero thereafter.

Preferably, moreover, the estimation of the disturbance torque includes a step of suitably obtaining the ratio between the torque constant and inertia of the motor, and more specifically, includes: (a) a step of obtaining a variation of a torque command for each of the last two processing periods

4 preceding the present period; (b) a step of obtaining an estimated speed of the motor from the variation of the torque command obtained in (a), an actual speed of the motor for each of the last two processing periods preceding the present period, and an estimated ratio of torque constant to inertia of the motor obtained in the last period; (c) a step of obtaining an estimated speed error equivalent to the difference between the actual speed of the motor and the estimated speed; and (d) a step of settling an estimated ratio of torque constant to inertia for the present period in accordance with the variation of the torque command obtained in (a) and the estimated speed error obtained in (c) so that the difference from the estimated ratio for the period directly preceding the present period is small when the variation of the torque command obtained in (a) is small, takes a value substantially proportional to the variation of the torque command before the variation of the torque command reaches a predetermined value, and is saturated and takes a certain fixed value when the variation reaches a value not smaller than the predetermined value, and setting the ratio of torque constant to inertia at a value on which the estimated ratio converges.

Preferably, furthermore, the estimated ratio $b^*(i)$ between the torque constant and inertia of (d) is obtained as follows:

$$b^*(i)=b^*(i-1)+\{\beta \cdot u \cdot e/(1+\beta u)^2\},$$

where u is the variation of the torque command obtained in (a), e is the estimated speed error obtained in (c), $b^*(i-1)$ is the estimated ratio for the preceding period previously obtained in (d), and $\beta$ is a setting parameter value.

According to the present invention, as described above, the magnitude of the disturbance torque just before the reversal of motor rotation is estimated by means of the disturbance torque estimator 5, and the integrator value from an integral term 2 of a speed control loop is divided into a frictional torque component and an acceleration torque component by using the frictional torque (1). At the time of the reversal of motor rotation, the target value for the integrator is set by inverting only the frictional torque without inverting the acceleration torque component, out of the integrator value (2). Moreover, the certain offset is applied to the speed command so that the integrator quickly shifts toward its target value (3). Thus, projections produced on an arcuate cut surface can be minimized when the quadrants change during arcuate cutting operation or the like, that is, when the moving direction of only one feed axis is reversed.

DESCRIPTION OF THE PREFERRED EMBODIMENTS

Figure 3:
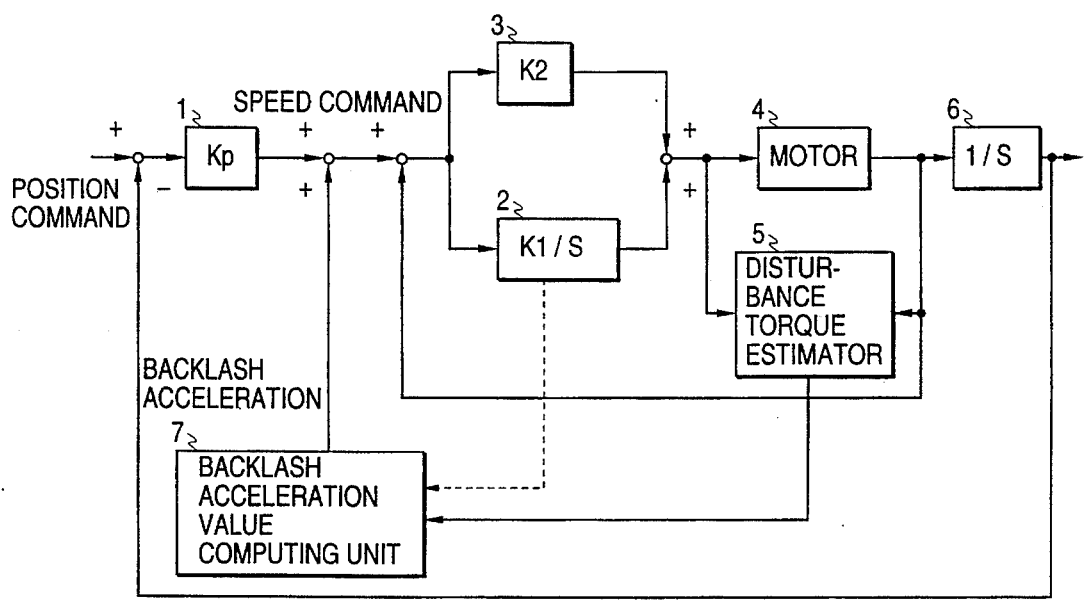
FIG. 3 is a block diagram of a position control loop system according to the present invention.

FIG. 3 is a block diagram of a position control loop system which includes a speed control loop and a current control loop. Kp of a block 1 is a position gain of a position control loop; blocks 2 and 3, an integral term and a proportional term, respectively, of the speed control loop; block 4, a servomotor; block 5, a disturbance torque estimator; block 6, a transfer function used in obtaining the position by integrating the speed of the servomotor; and block 7, a backlash acceleration value computing unit.

In the position control loop system described above, the blocks 5 and 7 constitute a section for effecting backlash correction according to the present invention, and all other sections except this backlash correcting section are similar to those of a conventional position control loop system. This position control loop system obtains a position deviation by subtracting a position feedback value from a pulse coder or the like, which is attached to the servomotor 4, from a position command delivered from a numerical control device, and obtains a speed command by multiplying the position deviation by a position gain Kp. Further, a torque command is obtained by subjecting the speed control loop to integral-plus-proportional control in accordance with the speed command and a speed feedback value of the actual speed of the servomotor 4, which is detected by a pulse coder or the like. The servomotor 4 is driven by executing a current control loop process.

On the other hand, the section for backlash correction is composed of the disturbance torque estimator 5 and the backlash acceleration value computing unit 7. The disturbance torque estimator 5 estimates the value of a frictional torque obtained immediately before the reversal of motor rotation and applies it to the backlash acceleration value computing unit 7, whereupon the backlash acceleration value computing unit 7 divides the value in an integrator from the integral term 2 of the speed control loop into a frictional torque component and an acceleration torque component by using the estimated frictional torque.

Then, the sum of the acceleration torque component and the frictional torque component with an inverted sign is set as a target value in the integrator after the reversal of motor rotation.

The conventional backlash control and the backlash control according the present invention differs in the following point. In the conventional backlash control, the value in the speed control loop integrator immediately before the reversal of direction is obtained, a value obtained by inverting the sign of this value is used as a target value of the integrator output, and backlash acceleration correction is carried out by using, as a backlash acceleration value for each speed control loop process, the product of a suitable constant value and a value which is obtained by subtracting the integrator value for each speed control loop process from the aforesaid target value, in each speed control loop process within a set time after the reversal of direction. In the backlash control according to the present invention, in contrast with this, the frictional torque is obtained by the disturbance torque estimator 5, and a necessary torque for the acceleration component is obtained by removing the frictional torque estimated by the disturbance torque estimator 5 from the torque in the speed control loop integrator immediately before the reversal of direction. When the motor is reversed, the integrator target value is set by reversing only the frictional torque component without reversing the acceleration torque component, and the speed command is offset so that the integrator quickly shifts toward the integrator target value. As a method for this integrator control, according to the present invention, the product of a suitable constant value and a value which is obtained by subtracting the integrator value for each speed control loop process from the aforesaid integrator target value for each speed control loop process is used as a backlash acceleration value for each speed control loop process.

Figure 4:
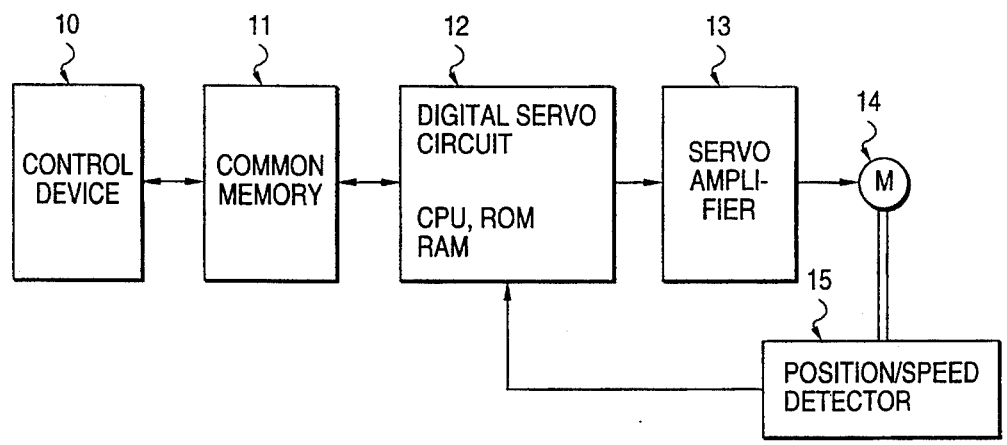
FIG. 4 is a block diagram showing the principal part of a servomotor control system for carrying out a motor control method according to the present invention.

FIG. 4 is a block diagram showing the principal part of a servomotor control system for carrying out a motor control method according to the present invention, in which numeral 10 denotes a control device for controlling a machine tool. A movement command, force command, and various control signals are delivered from this control device to a digital motor control circuit 12 through a shared memory 11. The digital servo control circuit 12, which is composed of a processor, ROM, RAM, etc., digitally executes motor control of the position, speed, force, etc., and controls a servomotor 14 for each axis by means of a servo amplifier 13 which is formed of a transistor inverter. Moreover, a numeral 15 denotes a position/speed detector for detecting the position and speed, which is composed of a pulse coder or the like mounted on the motor shaft of the servomotor, and delivers position and speed feedback signals to the digital servo control circuit 12. These arrangements are identical with the arrangements of conventional digital servo circuits.

Figure 5:
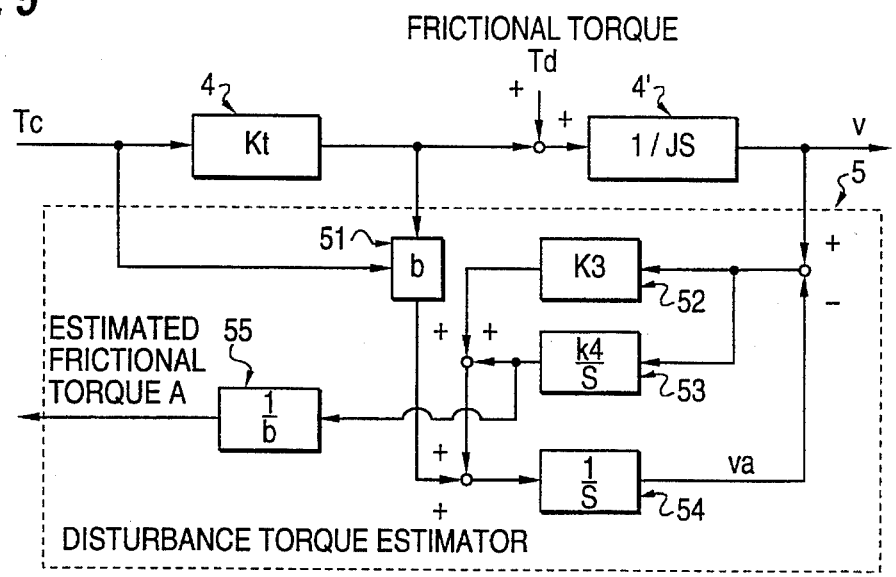
FIG. 5 is a block diagram showing the principal part of a disturbance torque estimator for carrying out the motor control method according to the present invention.

FIG. 5 is a block diagram showing the principal part of the disturbance torque estimator (disturbance estimating observer) for carrying out the motor control method according to the present invention. The disturbance torque estimator 5, which is surrounded by a dashed line is a disturbance estimating observer which estimates a frictional torque Td as a force which is externally applied to the servomotor. An estimated frictional torque A is obtained by estimating the frictional torque Td from a torque command Tc given to the motor and an actual speed v of the motor. In FIG. 5, numerals 4 and 4' denote motor units; Kt, the torque constant of the motor; and J, the inertia of the motor and machine moving parts. Symbol S designates a Laplace operator.

K3 and K4 of terms 52 and 53 of the disturbance torque estimator 5 are parameters of the disturbance 20 torque estimator (disturbance estimating observer) 5, and b of a term 51 is a parameter value by which the torque command Tc actually delivered to the servomotor is multiplied, and is a value obtained by dividing the torque constant Kt of the motor by the inertia J. Numeral 54 designates an integral term in which an estimated speed va of the motor is obtained by integrating the sum total of the respective outputs of the terms 51, 52 and 53. Moreover, a term 55 is a term in which the estimated frictional torque A is obtained by multiplying an output X from the term 53 by (1/b).

Analyzing the block diagram of FIG. 5 with b=Kt/J, we obtain $$\{Tc \cdot Kt + Td\}(1/J \cdot S) = v, \quad (1)$$

$$\{Tc \cdot (Kt/J) + (v-va)K3 + (v-va)(K4/S)\}(1/S) = va, \quad (2)$$

(where va is the estimated speed or the output of the integral term 54).

From equation (1), we obtain $$Tc = (v \cdot J \cdot S - Td)/Kt. \quad (3)$$

Substituting equation (3) for equation (2) and rearranging, we obtain $$v \cdot S - (Td/J) + (v-va)K3 + (v-va)(K4/S) = va \cdot S, \quad (4)$$

$$S(v-va) + (v-va) \cdot K3 + (v-va)(K4/S) = Td/J. \quad (5)$$

From equation (5), we obtain $$(v-va) = (Td/J) \cdot [1/\{S + K3 + (K4/S)\}]. \quad (6)$$

Based on equation (6), the integral value X or the output of the term 53 can be given by equation (7) as follows:

$$\begin{aligned} X &= (v - va) \cdot (K4/S) \\ &= (Td/J) \cdot \{K4/(S^2 + K3 \cdot S + K4)\}. \end{aligned} \quad (7)$$

By selecting the parameters K3 and K4 in equation (7) so that the poles are stabilized, X=Td/J can be approximated. A=X×(1/b)=Td/Kt is obtained by multiplying the computed integral value X by the reciprocal of the parameter b, 1/b (=J/Kt), whereby an estimated value A of the disturbance torque where the disturbance torque Td is adjusted to a disturbance value corresponding to a current command can be obtained. This estimated frictional torque A or the output of the disturbance torque estimator 5 is applied to the backlash acceleration value computing unit 7 of FIG. 3, whereupon the backlash acceleration value is obtained.

When obtaining the estimated disturbance torque (frictional torque) A using the disturbance torque estimator 5, as described above, the estimated acceleration of the motor is obtained by multiplying the torque command Tc by the parameter b, that is, ratio b of torque constant Kt to inertia J (term 51). Moreover, the estimated value A of the disturbance torque (frictional torque) is obtained by multiplication by the reciprocal, 1/b, of the ratio b of torque constant Kt to inertia J in the term 55. Accordingly, in reducing the error between the estimated value A of the disturbance torque and the actual disturbance torque Td, an estimated value corresponding to a more accurate disturbance torque can be obtained if the coefficients of the terms 51 and 55 are values closer to the actual ratio (Kt/J) of torque constant Kt to inertia J and its reciprocal (J/Kt), respectively.

However, the inertia J varies depending on the machine to which the servomotors are attached, so that the parameter b or the ratio of torque constant Kt to inertia J cannot be settled uniformly. Therefore, the parameter b may be obtained experimentally for each machine. According to the present embodiment, however, the parameter ratio b is estimated automatically.

Referring to FIG. 5, a value obtained by multiplying the torque command Tc by the torque constant Kt and the sum of the resulting value and the disturbance torque Td are integrated, and a value obtained by dividing the resulting integral value by the inertia J is equivalent to the motor speed v. Thereupon, if the torque command, actual speed of the motor, and disturbance torque for an i'th period corresponding to each predetermined sampling period Ts are Tc(i), v(i), and Td(i), respectively, and if the disturbance torque Td and torque command Tc make no change during the sampling period Ts, the motor speed v(i) can be given by equation (8) as follows:

$$v(i) = v(i-1) + (Ts/J) \cdot \{Kt \cdot Tc(i-1) + Td(i-1)\}. \quad (8)$$

In the last sampling period, moreover, equation (9) holds as follows:

$$v(i-1) = v(i-2) + (Ts/J) \cdot \{Kt \cdot Tc(i-2) + Td(i-2)\}. \quad (9)$$

Subtracting equation (9) from equation (8), we obtain $$\begin{aligned} v(i) - v(i-1) = v(i-1) - v(i-2) + (Ts/J) \cdot [Kt\{Tc(i-1) - \\ Tc(i-2)\} + Td(i-1) - Td(i-2)]. \end{aligned} \quad (10)$$

Assuming that there is no change in the disturbance torque, that is, if Td(i−1)=Td(i−2) is given, we obtain the following equation (11) from equation (10).

$$v(i) = 2 \cdot v(i-1) - v(i-2) + (Ts \cdot Kt/J) \cdot u(i-1). \quad (11)$$

Here u(i−1)=Tc(i−1)−Tc(i−2) is given.

Thereupon, equation (11) is rearranged into the following equation (12) with (Ts·Kt/J)=b*(i).

$$v^*(i) = 2 \cdot v(i-1) - v(i-2) + b^*(i-1) \cdot u(i-1). \quad (12)$$

In equation (12), b*(i−1)=(Ts·Kt/J) represents the ratio of the torque constant to the inertia, and v*(i) indicates the estimated speed of the motor estimated with use of the aforesaid b*(i−1).

The ratio b*(i) of the torque constant to the inertia (hereinafter referred to as estimated ratio) estimated for the sampling period i is estimated by using an estimated error e(i)=v(i)−v*(i) or the difference between the actual speed v(i) of the motor and the estimated speed v*(i) for the sampling period i. If a change u(i) (=Tc(i)−Tc(i−1)) of the torque command Tc is small, in this case, the estimated ratio b*(i) is estimated in an algorithm such that the change (b*(i)−b*(i−1)) of the estimated ratio is a very small value approximate to 0, that the change of the estimated ratio increases as the change u(i) of the torque command Tc increases, and that the change of the estimated ratio is saturated when the change u(i) of the torque command Tc becomes not smaller than a certain set value. In the present embodiment, the ratio is estimated according to equation (13) as follows:

$$b^*(i) = b^*(i-1) + \beta \cdot u(i) \cdot e(i)/(1 + \beta \cdot u(i))^2 \quad (13)$$

In equation (13), β is a parameter for settling the speed of convergence. If the process of equation (13) is executed for each sampling period, the estimated ratio b*(i) converges and takes a constant value. An accurate estimated value of the disturbance torque can be obtained by utilizing the converged constant estimated ratio b* as the parameter b for converting a command torque in the disturbance torque estimator 5 for estimating the disturbance torque into the estimated acceleration of the motor.

Figure 1:
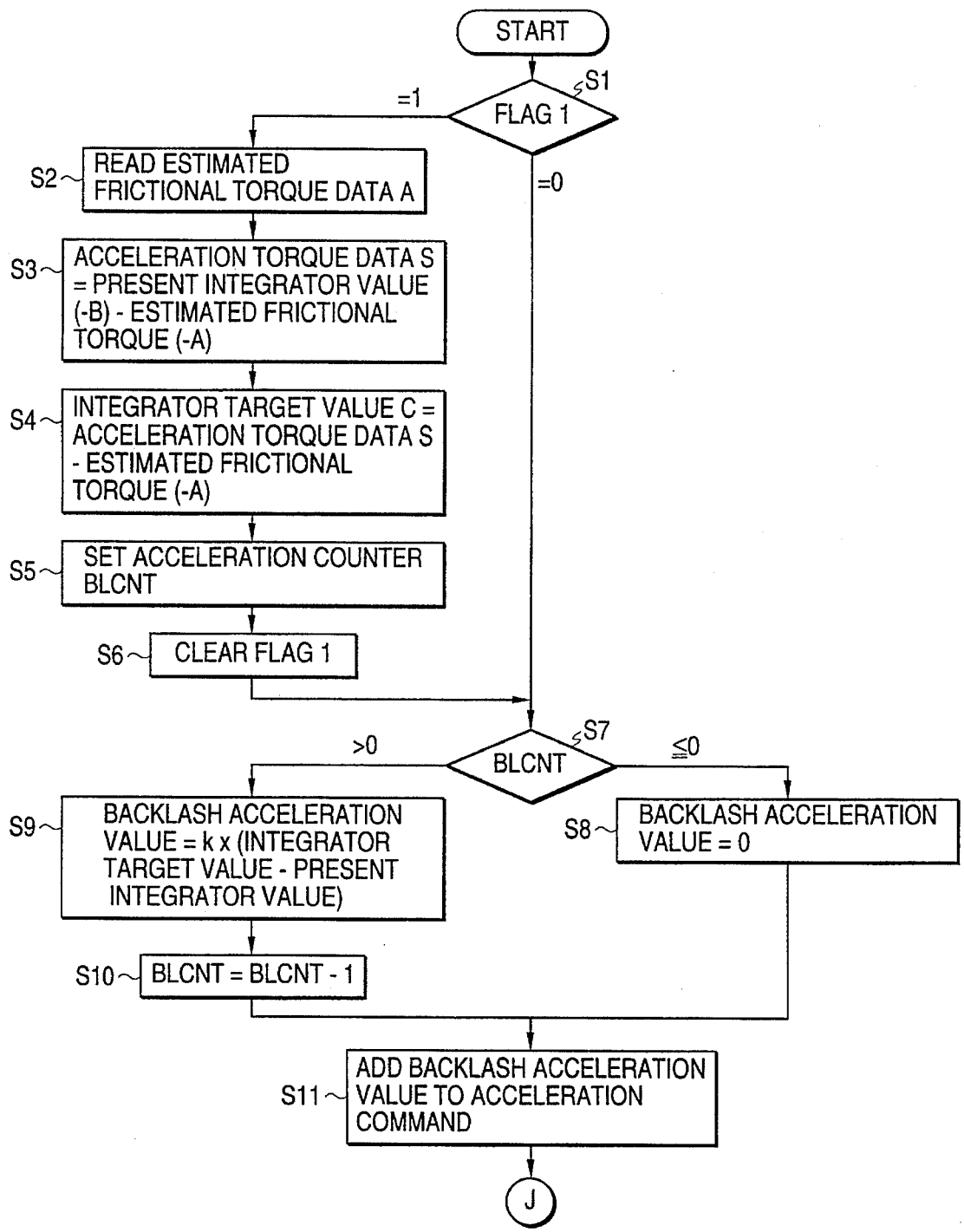
FIG. 1 is a flowchart showing processes carried out at every speed control loop processing period according to an embodiment of the present invention.
Figure 2:
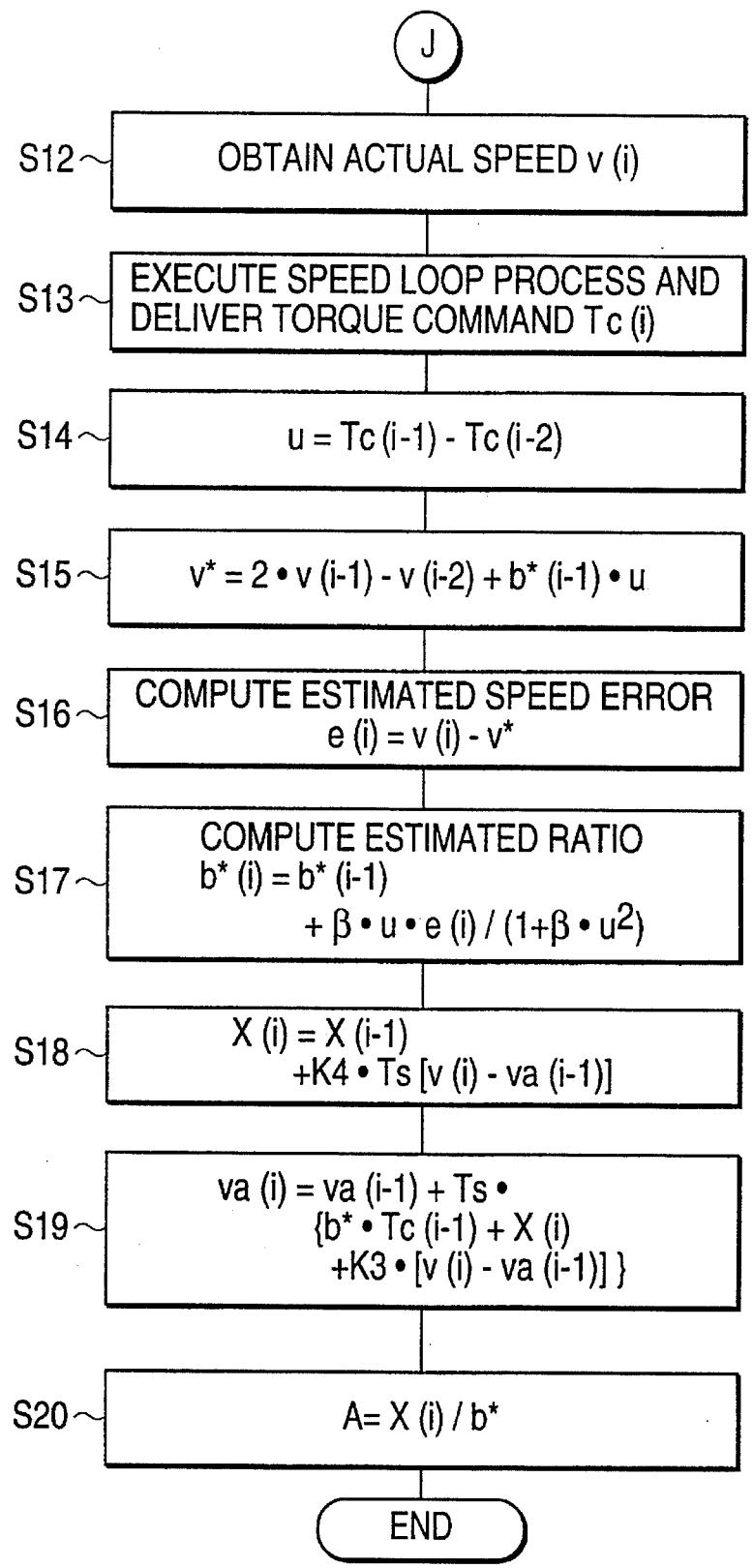
FIG. 2 is a continuation of the flowchart of FIG. 1.

The operation of the embodiment of the present invention will now be described with reference to the flowcharts of FIGS. 1 and 2, which show processes the processor of the digital servo (software servo) circuit 12 executes at every speed control loop processing period, and the diagram of FIG. 6 which illustrates the behavior of the integrator. Each step will be described with use of symbol Step S.

Step S1: First, the value of a flag 1 is determined. This flag 1 is a flag which indicates a first cycle of backlash acceleration, and is set to "1" when the processor (CPU) of the digital servo control circuit 12 detects the inversion of the sign of a distribution command delivered from the control device 10. More specifically, this flag is set to "1" only for one speed control loop at the start of backlash acceleration, and is reset to "0" when the backlash acceleration is not carried out. If the value of the flag 1 is set to "1" at the time of the determination of Step S1, therefore, the program proceeds to a process at the start of backlash acceleration. If the value of the flag 1 is set to "0", the program proceeds to a process (Step S8) in the case where the backlash acceleration is not started.

Whether or not the backlash acceleration is started can be determined by, for example, determining whether or not the sign of the position deviation is inverted.

Step S2: The estimated disturbance torque estimated by the disturbance torque estimator, in a process using the disturbance torque estimator which will be mentioned later, is read as the estimated frictional torque A.

Figure 6:
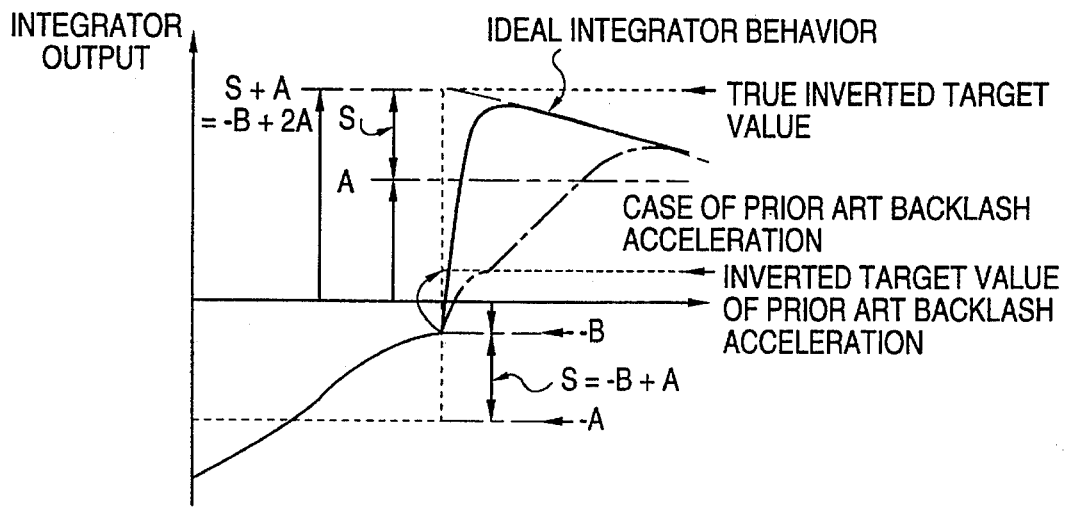
FIG. 6 is a diagram for illustrating the behavior of an integrator according to the present invention.

This estimated frictional torque A corresponds to a negative-side region indicated by broken line in FIG. 6, and has a value (−A). Here it is to be noted that A has a positive value.

Step S3: Then, acceleration torque data S is obtained from the torque in the integrator. As the speed of arcuate cutting increases, the percentage of an acceleration torque in a torque component of the integrator which consists of an acceleration torque and a frictional torque increases accordingly. If the acceleration torque components are represented by the acceleration torque data S, they amount to nonnegligible values in the case where the speed is high, as seen from the comparison between FIGS. 12D and 12H or as indicated by S in FIG. 8. Thus, if the inverted torque value is set as an inverted target value for the backlash acceleration on the assumption that only the frictional torque is the torque component in the integrator, as in the case of the conventional backlash acceleration, the integrator operates in the manner indicated by dashed line in FIG. 6, and the target value is set to be lower than a true inverted target value, so that the acceleration is insufficient. Accordingly, the acceleration torque component is obtained by dividing the torque component in the speed loop integrator into an acceleration torque component and a frictional torque component in this stage and subtracting the frictional torque component obtained in the aforesaid process of Step S2 from the present value in the speed loop integrator.

If the present value in the speed loop integrator is given by −B (B≧0), in this case, the acceleration torque data S, based on the relationship shown in FIG. 6, is represented by the following equation.

Acceleration torque data $S$=Present integrator value $(-B)$−Estimated frictional torque $(-A)$=$-B+A$.  (14)

Step S4: An integrator target value C of the speed loop integrator is obtained from the acceleration torque data S and the estimated frictional torque A. At the time of the reversal of motor rotation, the acceleration torque component, out of the torque components in the integrator, need not be inverted, and only the frictional torque component must be inverted. Therefore, the integrator target value C is the true inverted target value of FIG. 6, and is obtained according to the following equation.

Integrator target value $C$=Acceleration torque data $S$+Estimated frictional torque $(-A)\times(-1)$=$S+A$=$-B+2A$.  (15)

Equation (15) indicates that the integrator target value C is the sum of the present value (−B) in the integrator and a value (2A) obtained by doubling the value (A) which is obtained by inverting the sign of the estimated frictional torque (−A).

Steps S5 and S6: The value in an acceleration counter is set corresponding to the backlash acceleration correction time, this value is set in an acceleration counter BLCNT, and the flag 1 is cleared.

Step S7: The value in the acceleration counter BLCNT is determined. If this value is positive, the program proceeds to Step S9, whereupon the backlash acceleration is executed. If the value is 0 or negative, the program proceeds to Step S8.

Step S8: If the value in the acceleration counter BLCNT is 0 or negative, the backlash acceleration is not executed, so that the backlash acceleration value is regarded as 0 and loaded into a register or the like.

Steps S9 and S10: If the value in the acceleration counter BLCNT is positive, the backlash acceleration is executed, so that a value obtained by subtracting the present value B in the integrator from the integrator target value C obtained in Step S4 is multiplied by a constant K to obtain the backlash acceleration value for the period concerned, the acceleration value is loaded into a register or the like, and "1" is subtracted from the value in the acceleration counter BLCNT (value for one period is subtracted).

Step S11: The backlash acceleration value loaded into the register in Step S8 or S9 is added to the speed command obtained in the position loop process, and the resulting value is used as a speed command for the speed loop.

Steps S12 and S13: The actual speed v(i) is detected by the position/speed detector 15, the torque command Tc(i) is obtained by executing the speed loop process (PI control, etc.) in accordance with the actual speed v(i) and the speed command for the speed loop obtained in Step S11, and the torque command Tc(i) is delivered to the current loop to control the drive of the servomotors.

Step S14: A change value u of the torque command Tc is obtained by subtracting the torque command Tc(i−2) obtained in the second preceding period from the torque command Tc(i−1) obtained in a immediately preceding period before present processing period i, stored in a register.

Step S15: An estimated speed value v* is obtained by adding the product of the estimated ratio b*(i−1), obtained in the preceding period and stored in the register, and the change value u of the torque command, obtained in Step S1, to a value obtained by subtracting the actual speed v(i−2) detected in the second preceding period from a value obtained by doubling the actual speed v(i−1) of the servomotor detected in the immediately preceding period, stored in the register. In other words, the estimated speed value v* is obtained by carrying out the computation according to equation (12) mentioned before.

Step S16: The estimated speed error e(i) is calculated by subtracting the estimated speed value v* obtained in Step S15 from the actual speed v(i) of the servomotor detected in Step S12.

Step S17: The estimated ratio b*(i) is obtained by carrying out the computation of equation (13) mentioned before in accordance with the estimated speed error e(i), the estimated ratio b*(i−1) obtained in the preceding period stored in the register, and the change value u of the torque command Tc obtained in Step S14.

Then, processing of the disturbance torque estimator (disturbance estimating observer) 5 is started in accordance with this estimated ratio b*.

Step S18: An integral value X(i) of the observer for the present period is obtained by adding the product of the parameter K4 as the integral gain of the observer, the speed loop period Ts, and a value obtained by subtracting an estimated speed va(i−1) estimated in the preceding period and stored in the register from the actual speed v(i) read in Step S12, to an integral value X(i−1) for the preceding periods stored in an accumulator. In other words, the integral value X is obtained by executing the process of the term 53 in FIG. 5.

Step S19: An estimated speed va(i) for the present period is obtained by adding the product of the torque command Tc(i−1) for the preceding period stored in the register and the estimated ratio b* obtained in Step S17, the integral value X(i) obtained in Step S18, and the product of the parameter K3 as the proportional gain and a value obtained by subtracting the estimated speed va(i−1), which is obtained in the preceding period stored in the register, from the actual speed v(i) for the present period read in Step S12, and adding the product of the resulting sum and the speed loop period Ts to the estimated speed va(i−1) obtained in the preceding period. In other words, the process of obtaining the estimated speed va is executed according to the term 54 in FIG. 5.

Step S20: The disturbance torque or frictional torque A is obtained by dividing the integral value X(i) obtained in Step S18 by the estimated ratio b* obtained in Step S17, and is stored in the register, whereupon the processes for the speed loop period concerned are finished.

In the subsequent speed loop processing periods, the flag 1 of Step S1 is "0", so that the processes of Steps S2 to S6 for the backlash acceleration for the first period are skipped, and the program proceeds to the decision process of Step S7 for the acceleration counter BLCNT. Then, the processes of Steps S9 to S11 for the backlash acceleration correction, the speed loop process of Steps S12 and S13, the processes of Steps S14 to S17 for obtaining the estimated ratio b*, and the processes of Steps S18 to S20 for obtaining the frictional torque A are executed so that the value in the acceleration counter set corresponding to the backlash acceleration correction time in Step S5 becomes "0".

It is concluded that the backlash acceleration correction time has elapsed when the acceleration counter of Step S7 becomes "0", whereupon the backlash acceleration value is set to "0" so that the backlash acceleration correction cannot be effected (Step S8), and a conventional speed control loop process is carried out in accordance with the speed command obtained in the position control loop process.

Figure 7A:
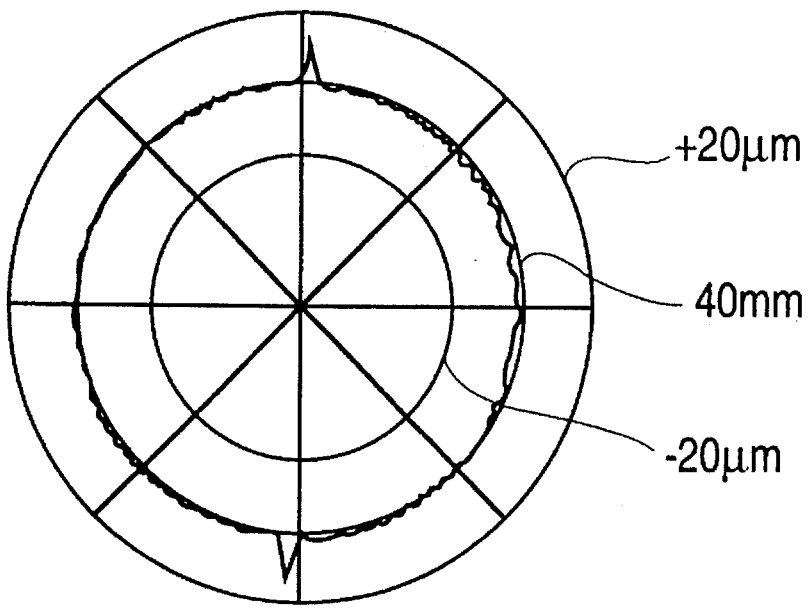
FIGS. 7A and 7B are diagrams showing the effects of an embodiment of the present invention.
Figure 7B:
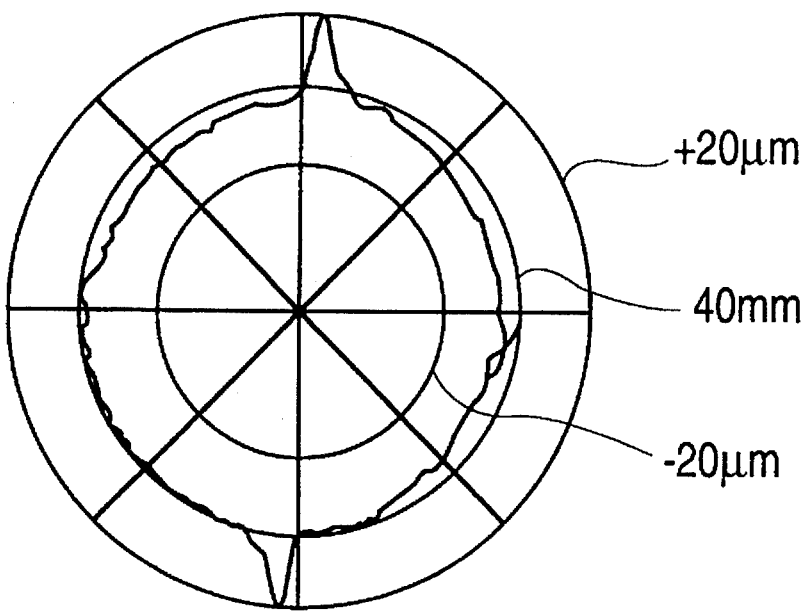
Figure 8A:
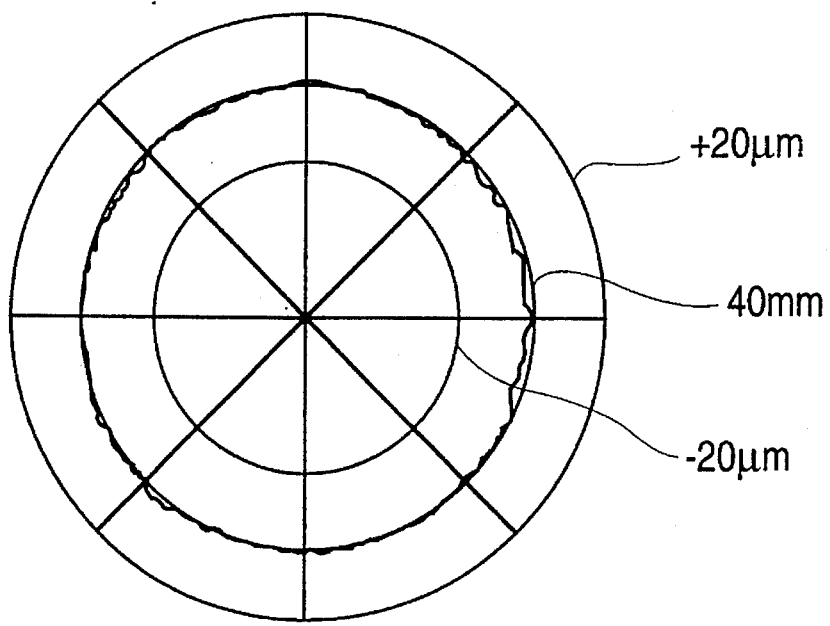
FIGS. 8A and 8B are diagrams showing the effects of an backlash.
Figure 8B:
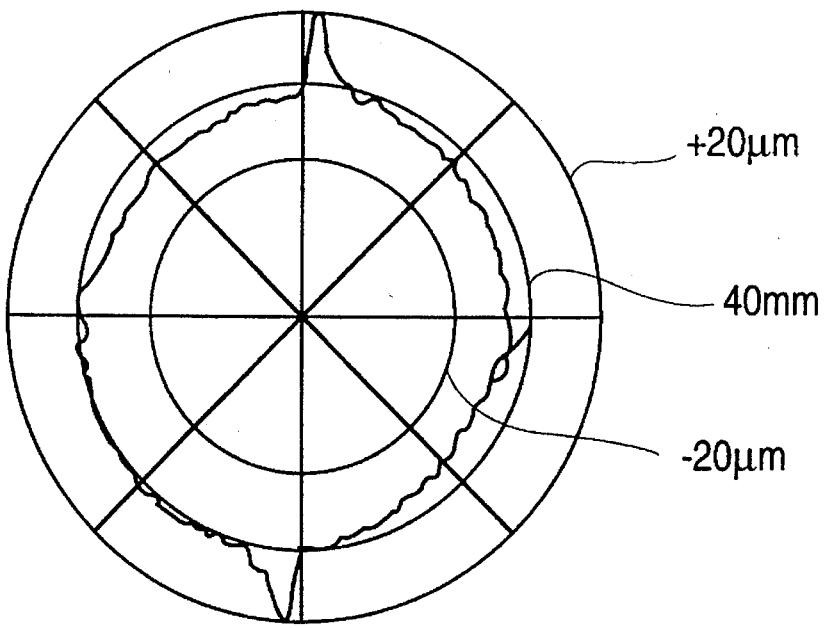
Figure 9A:
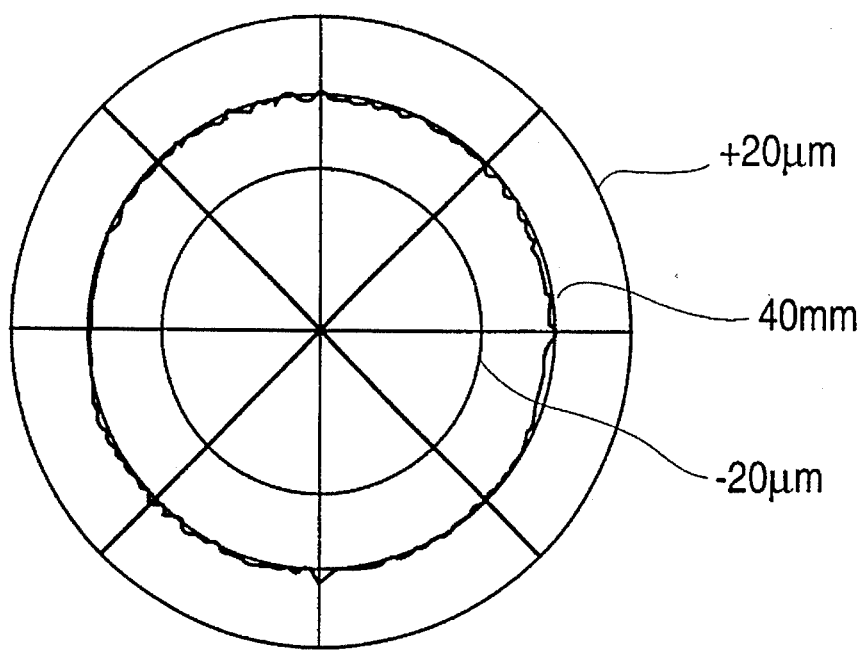
FIGS. 9A and 9B are acceleration diagrams showing the effects of an embodiment of the present invention.
Figure 9B:
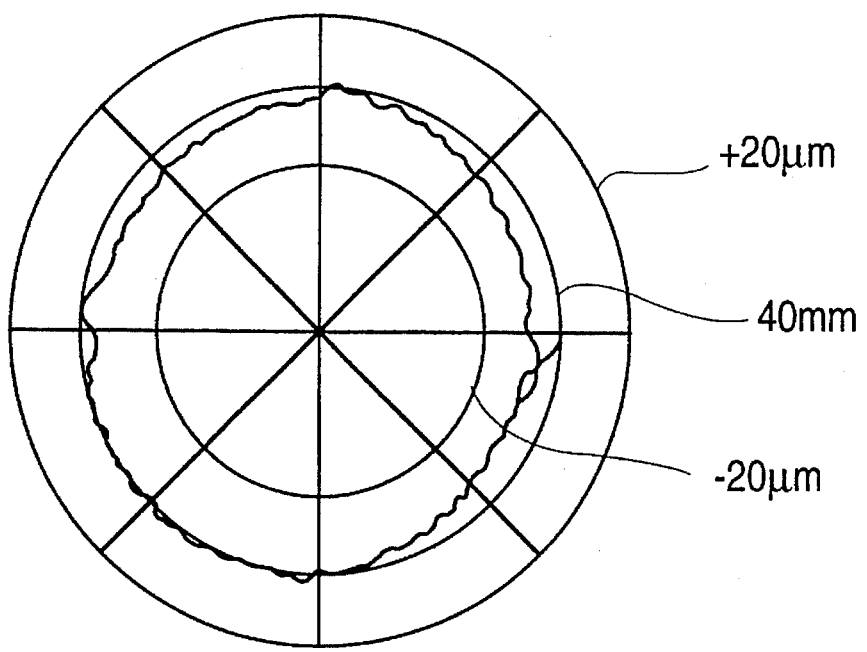

FIGS. 7A to 9B illustrate the effects of the embodiment of the present invention, in which FIGS. 7A–7B shows the case where any backlash acceleration is not effected. FIGS. 8A and 8B show the case where the conventional backlash acceleration is effected. FIGS. 9A and 9B show the case where the backlash acceleration of the motor control method according to the present invention is carried out. However, in FIGS. 9A and 9B, the estimated ratio b* was obtained by an experiment, without executing the processes of Steps S14 to S17 in FIG. 2.

In these individual drawings, a circular arc is illustrated in an enlarged scale with a radius of 40 mm and the deviation from an ideal cutting track compared to divisions of 20 μm. Through these figures, case (a) or FIGS. 7A, 8A and 9A, illustrated by upper diagrams, shows a result for a low-speed case in which the cutting speed is 1,000 mm/min., while case (b) or FIGS. 7B, 8B, and 9B, illustrated by a lower diagram, shows a result for a high-speed case in which the cutting speed is 6,000 mm/min. These examples of results indicate that projections are produced when the quadrants change in the X-axis direction on the Y axis.

In the case of FIGS. 7A and 7B where the backlash acceleration is not effected, projections are produced on the boundaries between the quadrants even at low speed, and projections of a greater height are formed at high speed.

In the case of FIG. 8A where the conventional backlash acceleration is effected, the height of projections on the boundaries between the quadrants is reduced by backlash acceleration correction at low speed. At high speed in FIG 8B, however, backlash acceleration correction is insufficient, so that projections are produced when the quadrants change.

In the case of FIGS. 9A and 9(B) where the backlash acceleration according to the present invention is effected, in contrast with this, backlash acceleration correction are achieved equally even at a high speed as well as at a low speed, so that production of projections on the boundaries between the quadrants can be restrained.

Figure 10A:
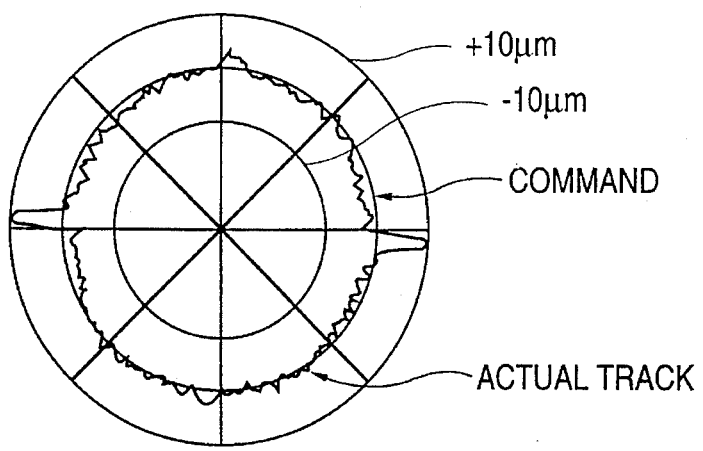
FIGS. 10A–10C are diagrams showing the effects of an embodiment of the present invention.
Figure 10B:
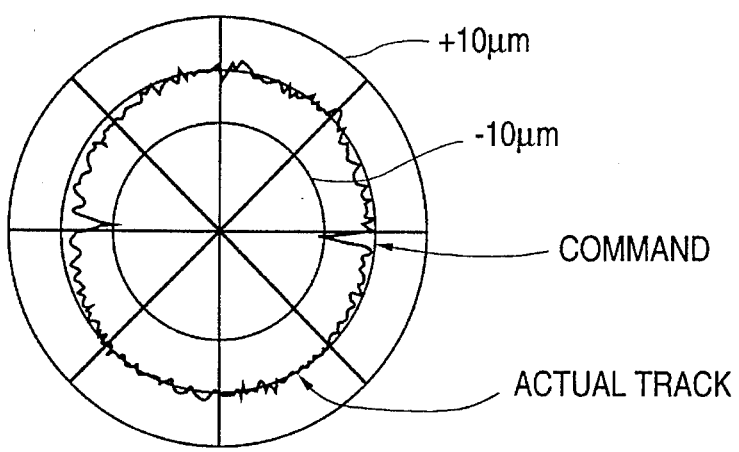
Figure 10C:
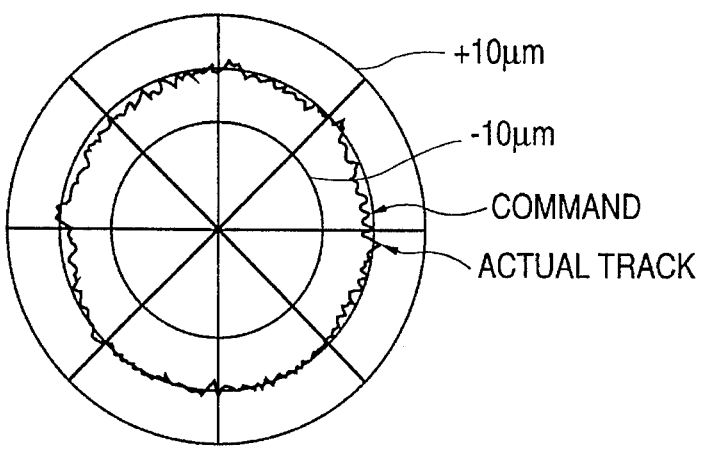
Figure 11:
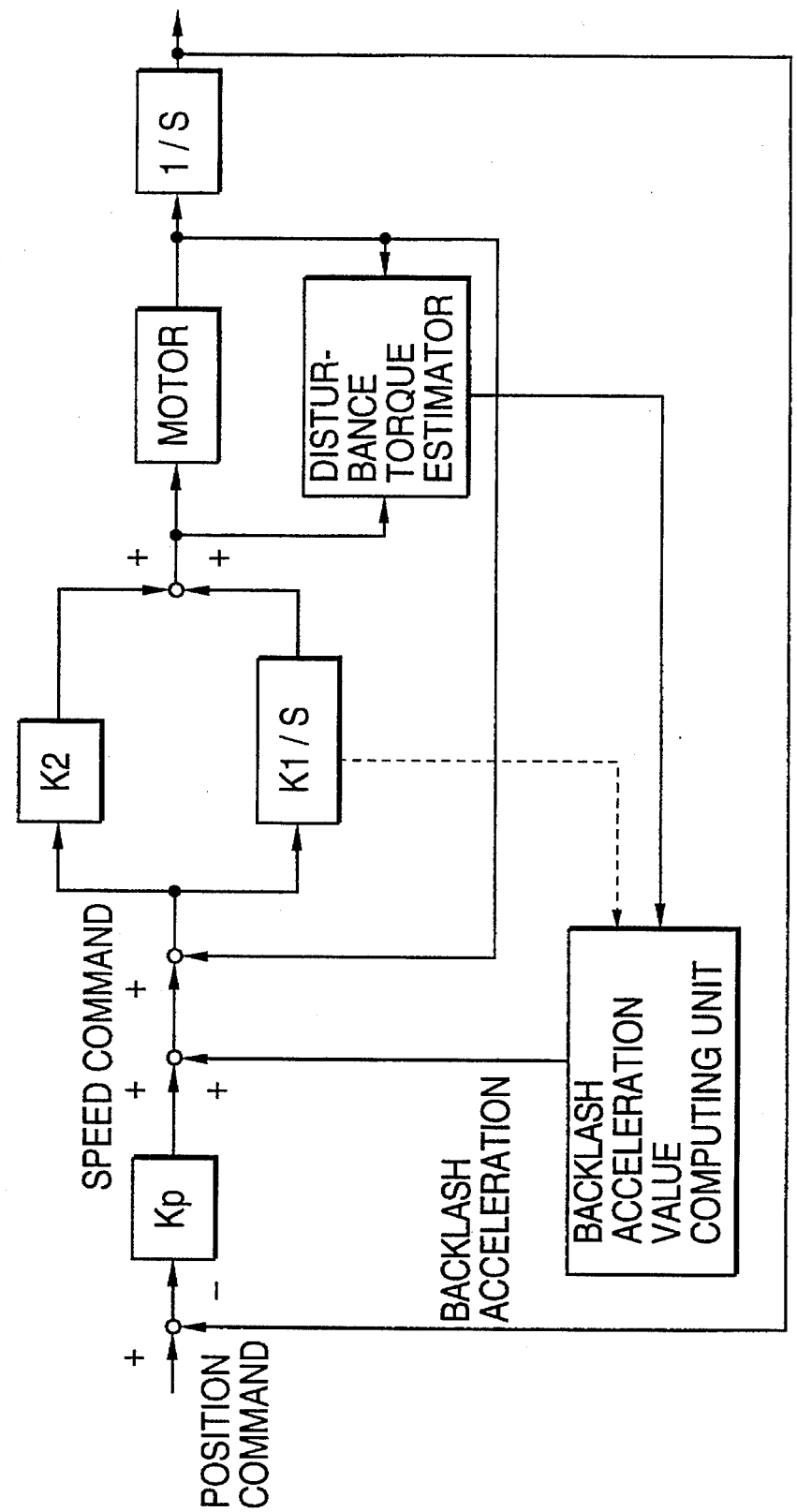
FIG. 11 is a block diagram illustrating a conventional motor control method based on backlash acceleration correction.

FIGS. 10A–10C are diagrams showing the results of experiments conducted in order to observe the effects of the present invention, which are obtained when the estimated ratio b* is estimated (Steps S14 to S17) and the processes (Steps S18 to S20) of the disturbance torque estimator are carried out in accordance with the estimated ratio b*. The experiment was carried out for a circular arc having a radius of 40 mm with machining speed of 4,000 mm/min. In FIGS. 10A–10C, deviation from the cutting track is shown in an enlarged scale, one deviation corresponding to 10 μm. FIG. 10A shows the case where the backlash acceleration correction is not effected FIG. 10B shows a result obtained when the parameter b is set at a certain value without estimating the estimated ratio b* although the backlash acceleration correction is effected. FIG. 10C is a diagram showing a result obtained when the estimated ratio b* is estimated, that is, when the embodiment of the present invention shown in FIGS. 1 and 2 is carried out.

In FIG. 10C, there are quadrant projections which are produced when the quadrant changes. In FIG. 10B, the backlash acceleration correction has an excessive effect so that recesses are formed in place of projections when the quadrants change. In the case of FIG. 10C, moreover, production of projections and recesses is restrained, so that high-accuracy machining can be achieved.

According to the present invention, as described above, the target value for the speed loop control integrator after the reversal of motor rotation can be set correctly, and the backlash correction can be optimized. Thus, the projections produced on an arcuate cut surface can be minimized when the quadrant changes during arcuate cutting operation or the like, that is, when the moving direction of only one feed axis is reversed.

We claim:

1. A control apparatus for controlling a servomotor, comprising:

disturbance torque estimating means for estimating the magnitude of a disturbance torque to which the servomotor is subjected;

integrator target value setting means for setting, as a target value for a speed control loop integrator, the sum of the value in the speed control loop integrator at the time of reversal of servomotor rotation and a value obtained by doubling a value which is obtained by inverting the sign of the disturbance torque just before the reversal of motor rotation, which is estimated by said disturbance torque estimating means;

speed command offset applying means for applying an offset to a speed command after the reversal of motor rotation so that the speed control loop integrator can quickly shift to the target value set by said integrator target value setting means; and means for sending the target value to the servomotor.

2. A control apparatus for a servomotor according to claim 1, wherein said offset is a value obtained by multiplying the difference between said set target value for said integrator and the present value therein by a certain coefficient.

3. A control apparatus for a servomotor according to claim 1, wherein said disturbance torque estimating means includes a term for a ratio of torque constant to inertia as a parameter of a motor model, and the value of said term is modified at every processing period.

4. A servomotor control method applied at the time of reversal of direction of feed axes of a machine tool using a servomotor, said control method for a servomotor comprising the steps of:

estimating a disturbance torque to which the servomotor is externally subjected just before the reversal of servomotor rotation;

dividing the value in a speed loop integrator into a frictional torque component, which is equal to said estimated disturbance torque, and an acceleration torque component;

setting in the speed loop integrator the sum of said acceleration torque component and a value obtained by inverting the sign of said frictional torque component, as an inverted target value, at the time of the reversal of servomotor rotation; and modifying a speed command by applying a certain offset to the speed command so that the integrator quickly shifts toward the inverted target value.

5. A servomotor control method according to claim 4, wherein said offset is a value obtained by multiplying the difference between said inverted target value set in the speed loop integrator and the present value therein by a predetermined coefficient.

6. A servomotor control method according to claim 4, wherein said estimation of the disturbance torque includes a step of suitably obtaining the ratio of torque constant to inertia of the motor.

7. A servomotor control method applied at the time of reversal of direction of feed axes of a machine tool using a servomotor, said control method for a servomotor comprising the steps of:

estimating a disturbance torque to which the servomotor is externally subjected just before the reversal of servomotor rotation;

dividing the value in a speed loop integrator into a frictional torque component, which is equal to said estimated disturbance torque, and an acceleration torque component;

setting in the speed loop integrator the sum of said acceleration torque component and a value obtained by inverting the sign of said frictional torque component, as an inverted target value, at the time of the reversal of servomotor rotation; and modifying a speed command by applying a certain offset to the speed command so that the integrator quickly shifts toward the inverted target value, wherein the addition of said offset to the speed command is repeated a preset number of times, and then said offset is zero thereafter.

8. A servomotor control method applied at the time of reversal of direction of feed axes of a machine tool using a servomotor, said control method for a servomotor comprising the steps of:

estimating a disturbance torque to which the servomotor is externally subjected just before the reversal of servomotor rotation;

dividing the value in a speed loop integrator into a frictional torque component, which is equal to said estimated disturbance torque, and an acceleration torque component;

setting in the speed loop integrator the sum of said acceleration torque component and a value obtained by inverting the sign of said frictional torque component, as an inverted target value, at the time of the reversal of servomotor rotation; and modifying a speed command by applying a certain offset to the speed command so that the integrator quickly shifts toward the inverted target value, wherein said step of suitably obtaining the ratio of torque constant to inertia of the motor includes:

(a) a step of obtaining a variation of a torque command for each of the last two processing periods preceding the present period;

(b) a step of obtaining an estimated speed of the motor from the variation of the torque command obtained in said step (a), an actual speed of the motor for each of the last two processing periods preceding the present period, and an estimated ratio of torque constant to inertia of the motor obtained in the last period;

(c) a step of obtaining an estimated speed error equivalent to the difference between the actual speed of the motor and said estimated speed; and (d) a step of settling an estimated ratio of torque constant to inertia for the present period in accordance with the variation of the torque command obtained in said (a) and the estimated speed error obtained in (c) so that the difference from the estimated ratio for the period immediately preceding the present period is small when the variation of the torque command obtained in said (a) is small, takes a value substantially proportional to the variation of the torque command before said variation of the torque command reaches a predetermined value, and is saturated and takes a certain fixed value when the variation reaches a value not smaller than said predetermined value, and setting the ratio of torque constant to inertia at a value on which the estimated ratio converges.

9. A servomotor control method applied at the time of reversal of direction of feed axes of a machine tool using a servomotor, said control method for a servomotor comprising the steps of:

estimating a disturbance torque to which the servomotor is externally subjected just before the reversal of servomotor rotation;

dividing the value in a speed loop integrator into a frictional torque component, which is equal to said estimated disturbance torque, and an acceleration torque component;

setting in the speed loop integrator the sum of said acceleration torque component and a value obtained by inverting the sign of said frictional torque component, as an inverted target value, at the time of the reversal of servomotor rotation; and modifying a speed command by applying a certain offset to the speed command so that the integrator quickly shifts toward the inverted target value, wherein the estimated ratio $b^*(i)$ between the torque constant and inertia of said (d) is obtained as follows:

$$b^*(i)=b^*(i-1)+\{\beta \cdot u \cdot e/(1+\beta u)^2\},$$

where u is the variation of the torque command obtained in said step (a), e is the estimated speed error obtained in said step (c), $b^*(i-1)$ is the estimated ratio for the preceding period previously obtained in said step (d), and $\beta$ is a setting parameter value.

* * * * *

UNITED STATES PATENT AND TRADEMARK OFFICE
CERTIFICATE OF CORRECTION

PATENT NO. : 5,598,077
DATED : January 28, 1997
INVENTOR(S) : Shunsuke MATSUBARA, et al.

It is certified that error appears in the above-indentified patent and that said Letters Patent is hereby corrected as shown below:

<u>Column 2</u>

Figure 12A:
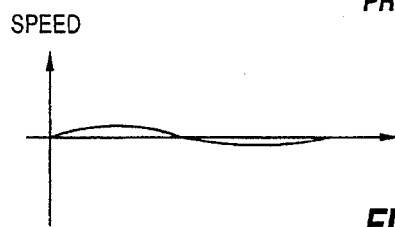
FIGS. 12A–12H are diagrams for illustrating the behavior of a motor in an arcuate motion.
Figure 12E:
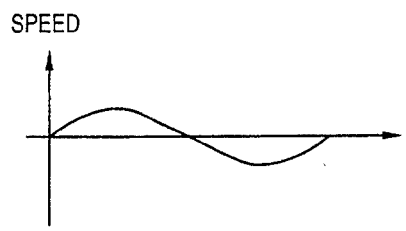
Figure 12B:
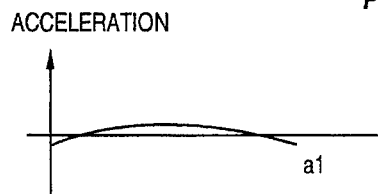
Figure 12F:
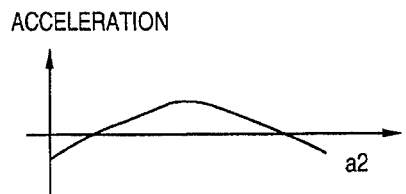
Figure 12C:
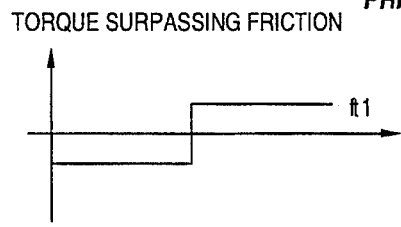
Figure 12G:
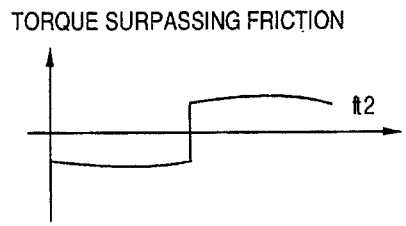
Figure 12D:
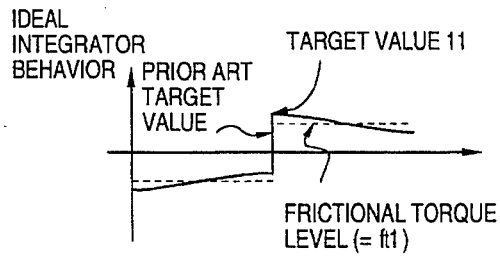
Figure 12H:
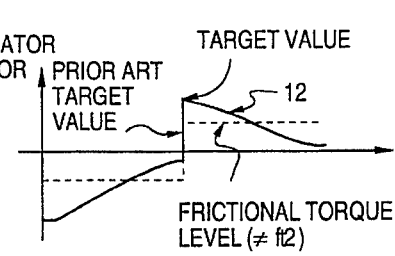
Figure 13:
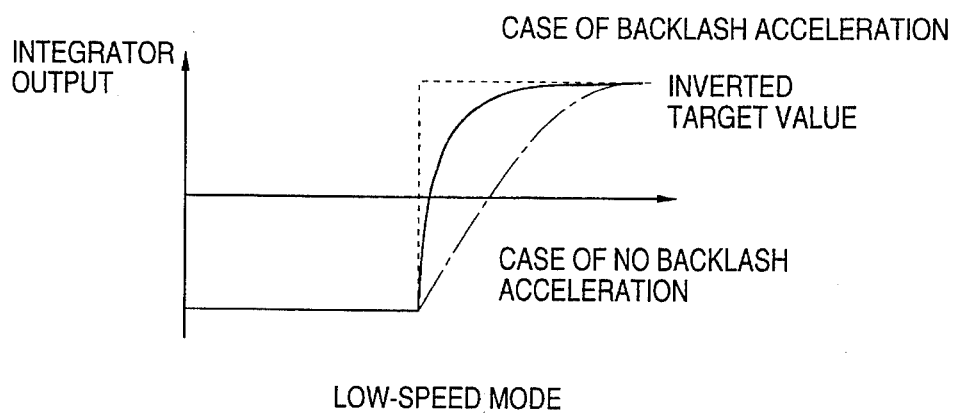
FIG. 13 is a diagram for illustrating the behavior of the integrator in a low-speed mode.
Figure 14:
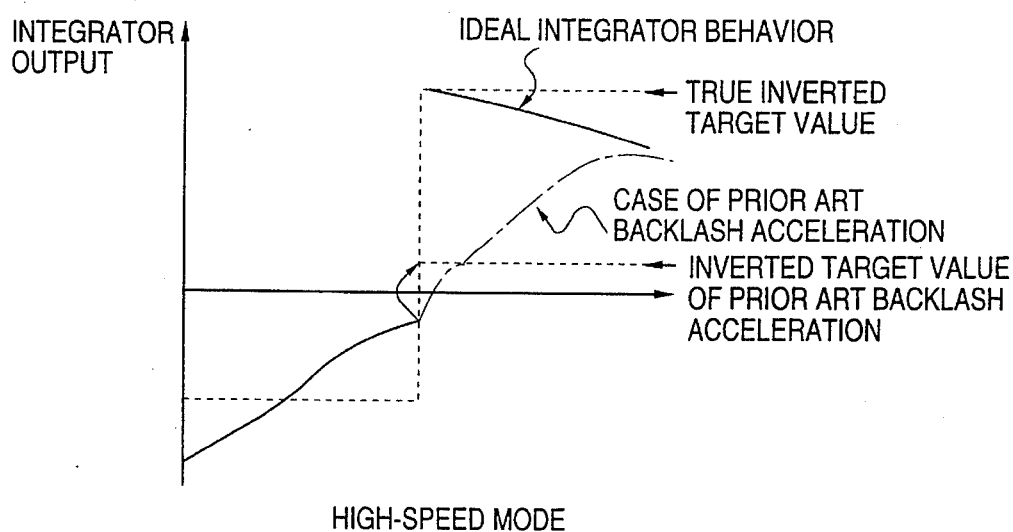
FIG. 14 is a diagram for illustrating the behavior of the integrator in a high-speed mode.

Line 15, "al" should be --a1--;

Line 23, "al" should be --a1--;

Lines 26 and 27, "(value I1 in (d) of FIG.12" should be --(value I1 in FIG. 12D--.

<u>Column 5</u>

Line 1, "an" should be --conventional--;.

<u>Column 6</u>

Line 59, delete "20".

<u>Column 12</u>

Line 13, "9(B)" should be --9B--;

Line 36, "10C" should be --10A--.

Signed and Sealed this

Eighth Day of April, 1997

Attest:

BRUCE LEHMAN

Attesting Officer

Commissioner of Patents and Trademarks